US007070499B2

(12) United States Patent
Ocampo

(10) Patent No.: US 7,070,499 B2
(45) Date of Patent: Jul. 4, 2006

(54) METHOD AND APPARATUS TO EXECUTE BETS

(76) Inventor: Fernando Vicente Ruiz Ocampo, Calle de Chupicuaro No. 55, Col. Letrán Valle, Mexico, D.F., 03650 (MX)

( * ) Notice: Subject to any disclaimer, the term of this patent is extended or adjusted under 35 U.S.C. 154(b) by 374 days.

(21) Appl. No.: 10/236,814

(22) Filed: Sep. 6, 2002

(65) Prior Publication Data

US 2003/0119582 A1 Jun. 26, 2003

(30) Foreign Application Priority Data

Sep. 7, 2001 (MX) .................... PA/a/2001/009037

(51) Int. Cl.
*G06F 17/00* (2006.01)
*G06F 19/00* (2006.01)

(52) U.S. Cl. .............................. 463/6; 463/25; 463/28

(58) Field of Classification Search ............ 463/40–42, 463/11–26, 6, 28; 273/148 B
See application file for complete search history.

(56) References Cited

U.S. PATENT DOCUMENTS 3,729,193 A * 4/1973 Labis ............................ 463/6
4,494,197 A * 1/1985 Troy et al. .................... 463/18
4,527,798 A * 7/1985 Siekierski et al. ............ 463/17
5,212,636 A * 5/1993 Nakazawa ...................... 463/6
5,411,258 A * 5/1995 Wilson et al. ................. 463/6
5,564,977 A * 10/1996 Algie .......................... 463/25
5,605,504 A * 2/1997 Huang ......................... 463/22
5,647,795 A * 7/1997 Stanton ....................... 463/25
5,746,657 A * 5/1998 Ueno .......................... 463/41
5,770,533 A * 6/1998 Franchi ....................... 463/42
5,830,068 A 11/1998 Brenner et al. ............... 463/42
5,957,775 A * 9/1999 Cherry ........................ 463/16
6,544,121 B1 * 4/2003 DeWeese et al. ............. 463/30
6,722,980 B1 * 4/2004 Stronach ...................... 463/25
6,773,347 B1 * 8/2004 Marshall et al. .............. 463/25
2001/0031656 A1 * 10/2001 Marshall et al. ............... 463/6

* cited by examiner

*Primary Examiner*—Julie Brocketti
(74) *Attorney, Agent, or Firm*—Birch, Stewart, Kolasch & Birch, LLP

(57) ABSTRACT

A method and apparatus are provided to execute bets that includes a plurality of buttons for creating derivative bets that modify an initial combination of groups of competitors to create derivative combinations of an original bet. The method and apparatus of the present invention incorporate new functions that make it easier for a bettor to enter and register wagers. The entering and registration of pari-mutuel wagers is made easier by the apparatus and method of the present invention.

2 Claims, 5 Drawing Sheets

METHOD AND APPARATUS TO EXECUTE BETS

This application claims priority to Mexican patent application MX-PA/a/2001/009037, having a priority date of Sept. 7, 2001.

REFERENCE TO APPENDIX

This application includes a computer program listing appendix, submitted on compact disc (CD). The content of the CD is hereby incorporated by reference in its entirety and accordingly forms a part of this specification. The CD contains the following files:

| File name | File size | Creation date for CD |
|---|---|---|
| NORMAL.txt | 53 kb | Nov. 5, 2002 |
| SHAFFLE.txt | 58 kb | Nov. 5, 2002 |
| TRISUP.txt | 55 kb | Nov. 5, 2002 |

BACKGROUND OF THE INVENTION

The horse race industry is not only formed by the race tracks; behind it there is a lot of human material among which the following can be highlighted: associations of horse owners, associations of trainers, associations of breeders, associations of jockeys, gallopers, stablemen, horseshoers, vet doctors, food and medicine suppliers, equine transporters, administrators, tellers, waiters, cleaning and general maintenance personnel but, above all, the essence that supports the industry, the bettors. In view of the above, this industry is an important source of employment and income.

As it is known, wagers are the main source of funds to furnish the industry. Presently, thanks to communications via satellite, it is possible to place bets in different horse race tracks with simultaneous races, even when the race tracks are distant from one another, without being important the bettor's location.

The wager in the horse races is called pari-mutuel bet, which means, "to bet among us". The bettors that wager in a pari-mutuel system are not betting against the racetrack but against the rest of the bettors; this means that the money of the losers bettors is distributed among the winners bettors.

When a wager is placed in the racetrack, that money goes to a "Pool" or betting fund; every type of wager has its own betting fund. The racetrack receives an amount of money as "takeout" or retention for handling the bets, which is assigned for the payment of prizes to the horsemen and breeders and for the expenses of the racetrack. The rest of the money of every type of bet is returned to the bettors in form of payoffs to the winners.

There are two main types of bets:

1. Straight Bets are those involving one competitor (horse, greyhound, car, etc.)

WIN: The bettor wins if the selected competitor finishes in the first position.

PLACE: The bettor wins if the selected competitor finishes in first or second position. However, even when the competitor wins, the bettor cashes the payment of Second position.

SHOW: The bettor wins if the selected competitor finishes in first, second or third position, but cashes payment of Third.

2. Exotic Wagers are those involving two or more competitor in one or more races.

Exact: The bettor wins if he/she selects the competitor that finish in first and second place, in exact order. For example:

Exact 3-5

Competitor number 3 must win and competitor number 5 must finish second.

Quinella: To win, the bettor must select the competitors that finish in first and second places but, unlike in the Exact wager, the order in which they finish is not important.

Trifecta: The bettor must select the three first places in the official order of finish.

Superfecta: The bettor must select the first four places in the official order of finish.

Triple: The bettor must predict the winners of three consecutive races; he/she must place his/her bet before the first of the three races begins.

Pick Six: The bettor must predict the winners of six consecutive races marked for this wager. If there are no winners in this bet, part of the pool will be accumulated on the next day of races, making it possible for huge jackpots to build.

Additionally, there are combinations of multiple wagers, as follows:

Box: It allows the bettor to select all possible combinations with the competitors picked for a bet. Every combination costs as one bet. For example:

Trifecta Box 1, 3, 5

The bettor will win if competitors numbers 1, 3 and 5 finish within the first three positions, in any order.

A Trifecta box bet is equivalent to the following (1×2×3=6) 6 bets

1. 1,3,5
2. 1,5,3
3. 3,1,5
4. 3,5,1
5. 5,1,3
6. 5 3,1

Key: It allows selecting a competitor to win with the other possible combinations.

Example:

Key 1 with 3,5

This means a bet to first on competitor number 1, and competitors 3 or 5 will finish in the second or third positions.

Such wager is equivalent to the following two bets.

1. 1,3,5
2. 1,5,3

A Key bet means a lower number of simple bets than a Box bet. Therefore, the cost of the Key bet is lower than the Box bet.

According to the current method of wagering, the bettor must perform the following steps for register a bet:

a) Go to a ticket window and give the mutuel clerk the following information:

1. The name of the race tract;
2. The race number to make a bet on;
3. The amount of the wager;
4. The type of bet to make
5. Give the number(s) of the competitor(s) shown in the program.

For example: "Santa Anita, Fifth race, $20 Dollars to win on number 6"

The prior at acknowledges basically four forms for registering bets:

1. By means of machines operated by mutuel clerks
2. By means of machines operated by the bettors themselves
3. Through cards, and
4. Recently, through the internet

OBJECT OF THE INVENTION

During the last years, the industry has made many attempts to increase the amount of the wagers through different forms and ideas, without positive results so far. Along the last 12 years, the inventor has been analyzing the different betting systems based in the different formats used in the racetracks in Mexico and in the United States.

Some attempts have been made to increase the amount of the bets. The U.S. Pat. No. 4,962,950 issued to Champion, describes a ticket which includes a random bet. With such ticket it is meant to show people going to the racetracks to have a better knowledge of the wagers. The problem, however, has not yet been resolved favorably.

Among the main problems, the following can be highlighted:

It has been noted that 60% of the bets are placed between two and three minutes before the race begins. This means obviously that the time required for the bettor to register his/her wager is essential.

The current registration of bets works with systems based on digital screens (touch screen) or optical scanners for cards, both operated by the bettors themselves and by machines operated by tellers. The systems used for the collection of wagers present serious problems of logical operation. Due to this fact, the time for the collection of wagers is excessive.

In the case of machines operated by the same bettor, in the current system, the registration of a wager "without making mistakes" can be done in around 20 seconds. However, a mistake in the data entered means having to go back and enter again data which had already been previously registered. This causes a loss of time (around 20 or 30 seconds more), to lose the sequence of the initial bet and, consequently, the bettor's mood is affected, which results into a lowering the amount of the wager he/she originally wishes to place, as well as into affecting the time of other people standing in the line for registering their wager.

For machines operated by mutual clerks, the situation becomes even more complicated, due to external issues to the bettor, such as the mood of the mutual clerk, who is not exempt of mishearing, or because the same bettor gives the teller mistaken information. Also failures due to mishearing means a consumption of time for registering a wager which results in reduction in the wager amount.

It also happens that when the bettor is registering his/her wagers, he/she becomes aware that his/her financial estimation was wrong and, therefore, he/she has insufficient money, reason why he/she has to modify his/her wager. That means a consumption of valuable time and results in a reduction in the wager amount. Mistakes due to Tellers, also results in consumption of registration time and reduction in the wager amount.

It is also common that when the bettor is registering its wager, the mutual clerk informs him/her that has been recently informed that a particular competitor has been withdrawn. The bettor has to make important changes in its wager. As indicated below, the wager registration is performed within the three of four minutes prior to the race, then the bettor can not have time enough to make new wager. Therefore, the bettor prefer to quickly enter a bet which is not the preferred bet. As result, the wager is decreased or can be canceled.

Summarizing, the wagers registration system according to the prior art allows to place bets in an easy way only when the combinations that make up the bet are simple. On the contrary, if the wager presents a certain degree of sophistication, the system itself makes it complicated to register the bet, causing uncertainty and fear to the bettor, which is reflected directly in the amount of wager money entering the racetracks or different betting centers. This means, uncertainty affects the mood of the bettor; the bettor prefers to decrease his/her wager in such a the manner which results easier to register. This is one of the causes by which it is not possible to increase the wagers.

The delays provoked by the tellers and bettors are due to the lack of a betting registration system which allows the reduction of wager registration times and, consequently, to increase the income in a way that will benefit the whole bets industry, in particular, the horse race industry.

It is therefore a first objective of the present invention to overcome the problems of the prior art and to increase the amount of the wagers in the horse and greyhound races or in any other event where it can be applied, for example, in car races.

A second objective is to provide a method and apparatus to reduce the time required to place a bet. The possibility of placing the bet in a brief period of time gives the bettor the certainty that the wager he/she wants is the one to be registered. Such certainty will lead the bettor to decide the amount of the wager that he/she considers more appropriate. It means that the bettor will increase or lower the amount of his/her wagers in the most appropriate manner.

Said certainty lead to the bettor not to decrease the amount of the wager due to inconveniences, moreover, said certainty will lead to the bettor to increase their wagers.

An additional objective is to provide a portable apparatus which will make it easier for the bettor to perform and place a wager.

Another objective is to provide a system which will facilitate the placement of wagers in a racetrack or in a betting center.

Another objective consists in making bettors familiar with the methods to place a wager.

Another objective of the present invention is to provide a method to perform and place bets.

SUMMARY OF THE INVENTION

The task of the method and apparatus of the present invention is to solve each and everyone of the problems that the horse race industry and/or similar regarding the collection in the registration of bets.

Even though the invention is mainly referred to horse races, it shall be understood that it also is applicable for greyhound races and, in general, for any type of pari-mutuel bet.

DETAILED DESCRIPTION OF THE INVENTION

Figure 1:
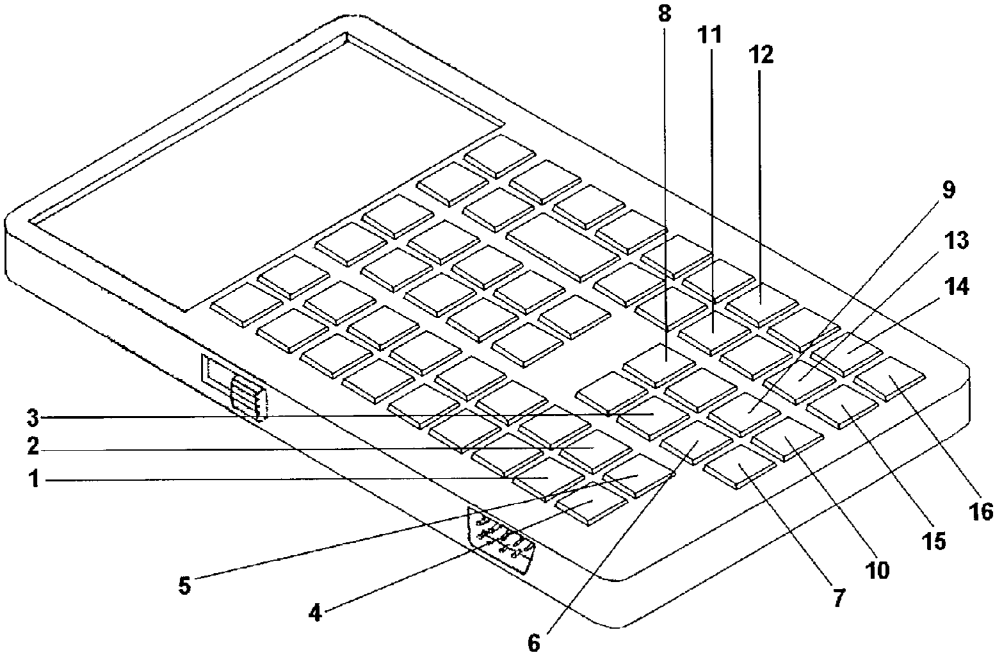
In FIG. 1 it is shown the group of betting keys of the invention's portable apparatus.

A electronic apparatus is described, portable preferably, by means of which it is possible to obtain the calculation of the different operations directly related to the horse and greyhound races in their various betting types or forms. The object of such apparatus is to help obtain the quantitative of the betting group or groups through the inclusion or deletion of competitors.

With the use of the portable electronic apparatus according to the present invention, a bettor can try the different possibilities before obtaining the best suitable wager for him/her, with the result obtained (selected bet) the bettor will go to the mutual clerk or to any means to enter his/her bet, with the certainty that the bet he/she wants to place is the convenient bet. Once the bettor has the full certainty about the wager he/she wants to place, his/her investment in the wager will be the highest. Upon placing his/her maximum wager, the amount of the bets will be consequently increased.

In an alternate embodiment of the invention, the portable electronic apparatus comprise means for the interaction with the machines to register bets located in the racetracks and multiple establishments who provide such service, in order to allow the bettor to officially register its wager from its portable apparatus. Therefore, the need to use mutual clerks will be diminished.

The bets in their context will be structured in the following manner; this is, they will be shown in the screen in this manner:

| 1st Group/ | 2nd Group/ | 3rd Group/ | 4th Group/ |
|---|---|---|---|
| (Competitors to first place) | (Competitors to second place) | (Competitors to third place) | (Competitors to fourth place) |

The apparatus according to the present invention comprises four fundamental parts, which are:

1.—The keyboard: it has a matrix shape, since it eases the codification of lines and columns, allowing up to 55 keys which can be increased if the number of competitors is increased. This capacity permits to have keys to select each competitor from 1 to 30 or more participants, including the keys of the several extra functions.

2.—Electronic circuit (processor). It is in charge of performing the mathematical operations using the data entered, to show later the results in the third element.

The program that performs the functions mentioned above is loaded in the processor; any type of processor can be used since the operations are very simple. However, the complexity lies in the different options of the keyboard, contemplated in the program.

3.—Liquid Crystal Display (LCD): This screen serves as output peripheral. Here are shown the data entered, as well as the results. Such display will be preferably of graphic type, since it makes easier the representation of different sizes of fonts and images, which will allow the presentation of all the necessary information. If the screen has predefined characters, it would only need to comply with the requisites to show the necessary information. It is considered that the crystal liquid display is the best option for the apparatus because it handles binary information and it is easily connected to the processor.

4.—Communication Peripheral (port): By communication peripheral we refer to the system with which it can be established the communication between the apparatus object of the present invention and the machines to register wagers.

This element is very diverse, since it will depend of the technology present at each moment; just as a mention, some types of elements can be:

Infrared rays signal

Tickets printer, with bar codes that can be read by the registers

Serial port, parallel, usb, or any type of port currently known in the computer media or to be developed in the future.

The keyboard's object is to allow the bettor to enter each and every data required to make the calculation of the wager.

The knowledge of the variables involved in a bet will help the bettor to develop his/her personal method of understanding a race, which results in a handicap or advantage of the bettor to place wagers. This handicap will mean a greater possibility to obtain positive results when placing a bet.

The description of the figures is presented ahead. Groups of keys are described, with the purpose of achieving a better description of each one of them:

The method and apparatus for the execution of bets according to the present invention comprises:

a) Bet selecting means b) Competitors selecting means c) Bet execution means d) Place combining means e) Secondary option means a) Bet Selecting Means

The bet selecting means comprises keys for selecting the type of wager to be placed.

The following table describes the different keys for selection of wagers:

GROUP I KEYS FOR TYPES OF BETS

| | NAME | FUNCTION |
|---|---|---|
| 1 | WIN | To first place. |
| 2 | PLACE | To second place. |
| 3 | SHOW | To third place. |
| 4 | WP | To first and/or second place at the same time. |
| 5 | WPS | To first and/or second and/or third at the same time. |
| 6 | DBL | To winners of two consecutive races. |
| 7 | QNL | To first and second place, in either order of finish. |
| 8 | PCK3 | To winners of three consecutive races. |
| 9 | PCK6 | To winners of six consecutive races. |
| 10 | PCK ALL | To winners of n consecutive races (n is variable). |
| 11 | EXA | To first and second place, selecting two groups. |
| 12 | EBX | To first and second place, selecting one only group. |

-continued

| GROUP I KEYS FOR TYPES OF BETS | | |
|---|---|---|
| | NAME | FUNCTION |
| 13 | TRI | To first, second and third place, selecting three groups which will finish in said order. |
| 14 | TRB | To first, second and third place, selecting one only group |
| 15 | SPX | To first, second, third and fourth place, selecting four groups which will finish in said order. |
| 16 | SPX | To first, second, third and fourth place, selecting one only group. |

The numbers of the first column are shown in FIG. 1, where it is described a apparatus according to the present invention.

The table above comprises the existing types of pari-mutuel bets. However, in accordance with the present invention, the bets are placed in a more efficient manner and in less time of execution.

Example: the bettor decides to place a trifecta bet; he then must activate the Trifecta bet

[TRI]

b) Competitors Selecting Means

The meaning of the competitors selecting means is to make the selection of competitors (horses, greyhounds, etc.).

Figure 2:
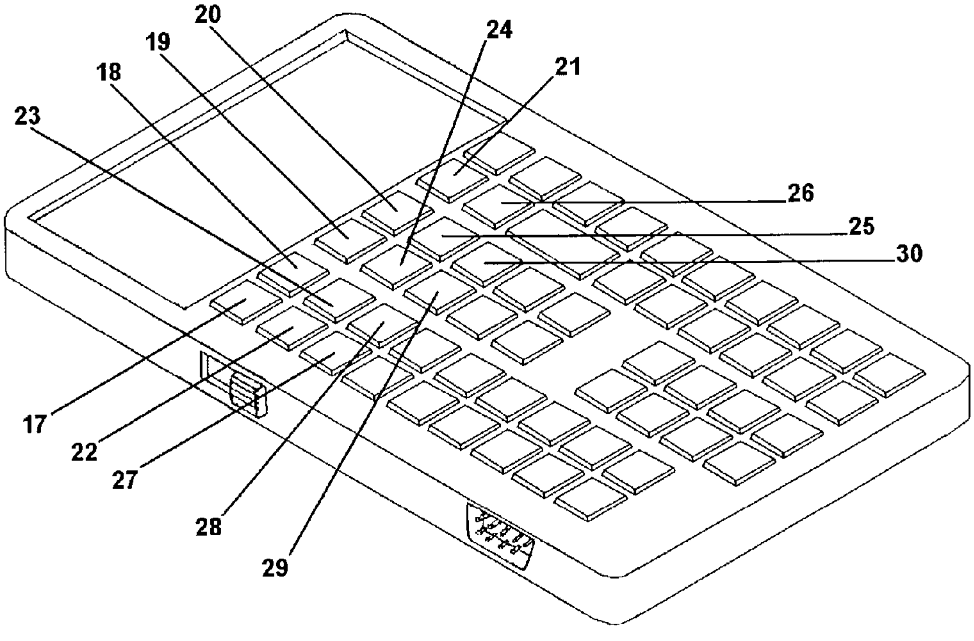
In FIG. 2 it is shown the group of competitors keys of the invention's portable apparatus.

To such effect, the competitor is selected from any of the selection keys shown in FIG. 2.

The series of keys that can be used to select the competitors of each group conforming the wager are described in the following table.

| GROUP II KEYS FOR SELECTION OF COMPETITORS | | |
|---|---|---|
| | NAME | FUNCTION |
| 17 | “1” | Selects the competitor marked with number 1 |
| 18 | “2” | Selects the competitor marked with number 2 |
| 19 | “3” | Selects the competitor marked with number 3 |
| 20 | “4” | Selects the competitor marked with number 4 |
| 21 | “5” | Selects the competitor marked with number 5 |
| 22 | “6” | Selects the competitor marked with number 6 |
| 23 | “7” | Selects the competitor marked with number 7 |
| 24 | “8” | Selects the competitor marked with number 8 |
| 25 | “9” | Selects the competitor marked with number 9 |
| 26 | “10” | Selects the competitor marked with number 10 |
| 27 | “11” | Selects the competitor marked with number 11 |
| 28 | “12” | Selects the competitor marked with number 12 |
| 29 | “13” | Selects the competitor marked with number 13 |
| 30 | “14” | Selects the competitor marked with number 14 |

The numbers of competitors (first column) are shown in FIG. 2.

For example:

1,4,6,7

It means, the bettor wagers on any of competitors 1, 4, 6 or 7 will finish in first place.

As it can be noted, the selection of competitors 10, 11, 12, 13 and 14 is done by pressing one only key. This fact leads to savings in time for the tellers, which, in turn, leads to the advantages mentioned before. As could be noted for a skilled in the art, if the number of competitors is increased (more than 15), the corresponding keys could be added.

c) Bet Execution Means

The object of the beat execution means id to make the second and subsequent selections of competitors to second and third, or third and fourth place repeating the fist selection and modifying it without need to introduce again every competitor key for each competitor.

The selection of competitors to second and third, or third and fourth place is done through the execution functions shown in the following table:

| GROUP III EXECUTION KEYS | | |
|---|---|---|
| | NAME | FUNCTION |
| 31 | WITH | Indicates the change of group to continue with the bet. |
| 32 | SAME +/− | Repeats the competitors selected in the previous group, being able to delete or include other competitors. |
| 33 | DELETE COMPETITORS | Allows deleting competitors previously entered, from the group being registered at that moment. |
| 34 | ALL − | Selects all participating competitors, allowing deleting the unwanted. |

Figure 3:
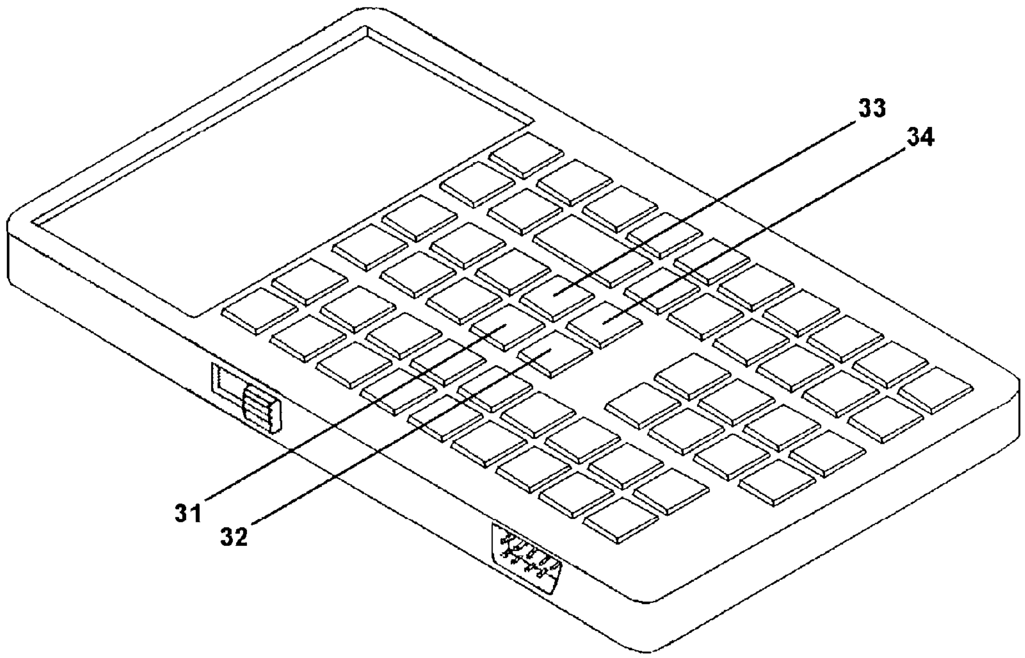
In FIG. 3 it is shown the group of manipulation keys of the invention's portable apparatus.

The keys of the first column are shown in FIG. 3.

To make the second and subsequent selections, the With function is used and the selection of competitors to second place is indicated.

1, 4, 6, 7[With] ’1, 4, 6, 7/

In accordance with the invention’s method, the function Same +/− enters the first selection previously entered.

1, 4, 6, 7/[Same+/−] ’1, 4, 6, 7/1, 4, 6, 7

The above means that the bettor bets that any of the competitors 1, 4, 6 or 7 will finish in first place AND that any of the competitors 1, 4, 6 or 7 will finish in second place.

Normally, a bettor considers that the competitors, which will arrive in the first position, can be the same that will arrive in the second place; that is why the utilization of the function “Same” is particularly useful.

Next, the selection to third place is made, repeating the sequence of steps mentioned for the selection to second place.

1, 4, 6, 7/1, 4, 6, 7[With][Same+/−] ’1, 4, 6, 7/1, 4, 6, 7/1, 4, 6, 7

Function [Same+/−] allows additionally to add or delete competitors to such selection, for example:

1, 4, 6, 7 / 1, 4, 6, 7/[Same+/−]6,2 ’1, 4, 6, 7, /1, 4, 6, 7/1, 2, 4, 7

In the last selection (1, 4, 6, 7), competitor 6 was deleted and competitor 2 was added.

This expression means that the bettor wagers on any of the competitors 1, 4, 6 or 7 finishing in first place AND that any of the competitors 1, 4, 6 or 7 will finish in second place AND that any of the competitors 1, 2, 4 or 7 will finish in third place.

To enter the aforementioned wager, the operator or the bettor must have pressed 10 keys, while according to the apparatus of the prior art, the entering of such bet requires pressing 14 keys. The usage of the method and apparatus of the present invention is translated into time savings to place a bet of approximately 70% with respect to the procedure and apparatus of the prior art.

For the selection of competitors to fourth place, the selection sequence must be repeated.

The object of the function ALL—is to select the group of participants, except the ones indicated by the bettor. Example considering one race of 8 competitors

1, 2/2, 6[ALL—5,1]'1, 2/2, 6/2, 3, 4, 6, 7, 8

The use of such function allows the bettor to select all competitors and delete only the ones that he/she considers convenient. It is worth mentioning that one piece of information to be introduced by the bettor is the number of competitors in such race.

In accordance with the present invention, the method includes, additionally, the possibility of correcting mistakes. For example, in the last bet, if the bettor decides that the competitor number 3 shall substitute competitor 2, he/she must use the function delete [DEL] and add the correct number. For example:

1, 4, 6, 7/1, 4, 6, 7/1, 2, 4, 7[DEL]2 3'1, 4, 6, 7/1, 4, 6, 7/1, 3, 4, 7

In the apparatus of the prior art it is not possible to delete mistakes; in case of a mistake the sequence has to be repeated entering the correct number.

In a variety of the invention, the method of the present invention is done through machines operated by tellers. The machines of the present invention may advantageously substitute the machines operated by tellers of the prior art.

The incorporation of the functions mentioned before allows to place a wager in a quicker way. As a particularly outstanding effect of the invention, the entering time is reduced in 70% with respect to the registration time in the machines of the previous technique in a bet "without making mistakes".

The apparatus of the present invention incorporates the method that includes the steps or functions previously described.

d) Place Combining Means

Figure 4:
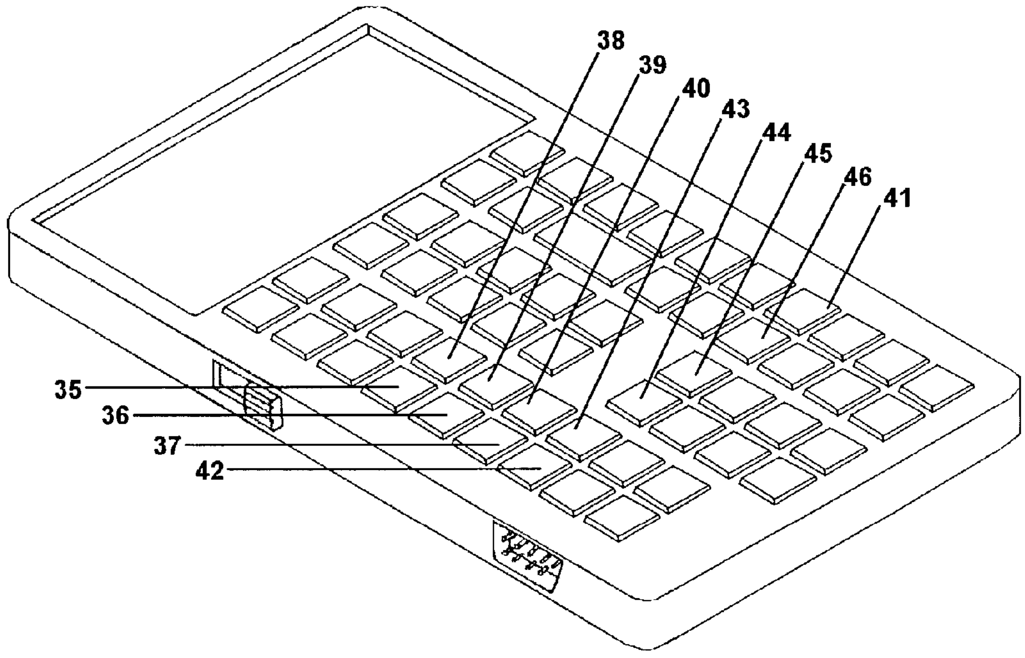
In FIG. 4 it is shown the group of movement keys of the invention's portable apparatus.

The Place combining means comprises the keys shown in FIG. 4. This group refers to the series of keys used to perform the different combinations of the groups previously selected (original bet). The movement keys are particularly useful for the exacta, trifecta and superfecta bets. Each one of the keys in this group are defined in the following table:

GROUP IV MOVEMENT KEYS

| | NAME | FUNCTION |
|---|---|---|
| 35 | 1 ST. | Selects all competitors located in the first group, to move them subsequently with keys "1", "2" or "3". |
| 36 | ¾ TH. | Selects all competitors located in the third or fourth group position or place, according to the type of bet, to move them subsequently with keys "1", "2" or "3". |
| 37 | O.B. | When being pressed, shows the original bet, it means, the initial combination entered. |
| 38 | "1" | Moves the group of competitors previously selected in a position or place. |
| 39 | "2" | Moves the group of competitors previously selected in two positions or places. |
| 40 | "3" | Moves the group of competitors previously selected in three positions or places in superfecta bet. |
| 41 | TRI v SUP | Permits to turn the registration of bets of the trifecta type into superfecta and vice versa. In the trifecta mode it will include the same competitors of the third group into a fourth group in an automatic manner; on the contrary, in the superfecta mode it will perform automatically the union of the fourth group's competitors with the third position group's competitors. |
| 42 | MIX 1 | It makes all possible combinations among the groups while maintaining fixed, it means as pivot position, the first position group's competitors. |
| 43 | MIX 2 | It makes all possible combinations among the groups while maintaining fixed, it means as pivot position, the second position group's competitors. |
| 44 | MIX 3 | It makes all possible combinations among the groups, while maintaining fixed, it means as pivot position, the third position group's competitors. |
| 45 | MIX 4 | It makes all possible combinations among the groups, while maintaining fixed, it means as pivot position, the fourth position group's competitors. |
| 46 | MIX ALL | It makes all possible combinations among the groups, without maintaining fixed any group. |

Once a bettor has made a selection of wager, he/she needs to perform some movements to be sure that he/she will obtain the best benefit. In agreement with the present invention, it is provided the means for the possible variants to be automatically generated, which will result in a benefit for the bettor.

When the bettor is confident that the wager he/she will make is the one that gives him/her better possibilities of winning, he/she will place bets independently of the amount of money.

In agreement with the present invention, function [1$^{st}$] selects the competitors located in the first group to subsequently move them with the keys 1, 2 or 3.

This means that the bettor makes a second wager, in which the groups have changed place.

Example. A bettor decides to place the following wager:

(1) TRIFECTA 1,2/1,2,3/2,3 (original bet) cost $3.00

The aforementioned bet comprises the following bets:

| No. | Bet | Cost |
|---|---|---|
| 1 | 1/2/3 | $ 1.00 |
| 2 | 2/1/3 | $ 1.00 |
| 3 | 1/3/2 | $ 1.00 |
| | Total | $ 3.00 |

This means, the bettor considers that any of competitors 1 or 2 will finish first place, any of competitors, 1, 2 or 3 will finish in the second position and that any of competitors 2 or 3 will finish in the third place.

Function [1$^{st}$] selects the competitors of the first group to move them towards the second, third or fourth (only in the case of superfecta bets) group.

Example:

(2) 1,2/1,2,3/2,3[1$^{st}$]2' 1,2,3/1,2/2,3 (cost $3.00)

The bettor can decide that competitors of group 2 can be third; function [3/4$^{th}$] allows to make the bet by pressing only two keys.

Example:

(3) 1,2/1,2,3/2,3[3/4$^{th}$]2' 1,2,3/2,3/1,2,3 (cost $3.00)

Since the bettor considers less probable that competitor 3 finishes in first place, he can complete the wager with a simple trifecta bet:

(4) 3, 2, 1 Cost ($1.00)

The bettor will have made the following wagers:

| No. | Bet | Cost |
|---|---|---|
| 1 | 1,2/1,2,3/2,3 | $ 3.00 |
| 2 | 1,2,3/1,2/2,3 | $ 3.00 |
| 3 | 1,2,3/2,3/1,2,3 | $ 3.00 |
| 4 | 3/2/1 | $ 1.00 |
| | Total | $ 10.00 |

In accordance with the prior art, a trifecta box bet offers the possibility of combining the competitors in all positions as follows:

| No. | Bet | Cost |
|---|---|---|
| 1 | 1/2/3 | $ 1.00 |
| 2 | 1/3/2 | $ 1.00 |
| 3 | 2/1/3 | $ 1.00 |
| 4 | 2/3/1 | $ 1.00 |
| 5 | 3/1/2 | $ 1.00 |
| 6 | 3/2/1 | $ 1.00 |
| | Total | $ 6.00 |

The bettor will have invested more money, $10.00 instead of $6.00 but his/her possibilities of winning are higher, as shown below:

| | (bets, winning tickets) | |
|---|---|---|
| Order of finish | Trifecta Box | Trifecta Invention |
| 1/2/3 | 1 | 3 |
| 1/3/2 | 1 | 2 |
| 2/1/3 | 1 | 2 |
| 2/3/1 | 1 | 1 |
| 3/1/2 | 1 | 1 |
| 3/2/1 | 1 | 1 |

With the method and apparatus of the invention, the bettor has better chances of winning. In case the bettor's selection is correct, the possibility that the bettor considered most appropriate will give him/her the best dividends. However, he/she will also win if the outcome is the one the bettor considered as the less probable.

Due to benefits provided to the bettor by the method and apparatus of the invention, the bettor will be able to place the bets that best conform to his/her predictions and, therefore, such bets will be better suited to his/her expectations and will give him/her the greater satisfaction. As a consequence of the above, the amounts of the wagers will be increased.

In the superfecta wagers, the bettor bets on the finishing order of four participants. It is worth mentioning that in the superfecta bets, the degree of difficulty is greater since the possibilities of winning are lower; however, such bet offers bigger payoffs.

The method and apparatus of the invention provides the following tools to the bettor.

Function [MIX 1] generates automatically for the bettor a mix of the groups of the bet, leaving the first group (group to first place) constant. Example:

A bettor considers the following wager:

2,3,4/2,3,4,6/4,5,6,7/All—2,3,6,8,10,13,14 (128 bets)

2,3,4/2,3,4,6/4,5,6,7/1,4,5,7,9.11,12 [MIX1]

Will obtain the combinations maintaining the first group, it means

1. A/B/C/D (original)
2. A/B/D/C
3. A/C/B/D
4. A/C/D/B
5. A/D/B/C
6. A/D/C/B

For simplification reasons, groups are represented with letters.

Automatically, the apparatus of the invention will generate the following bets:

| No. | Bet | Cost |
|---|---|---|
| Original | 2,3,4/2,3,4,6/4,5,6,7/1,4,5,7,9,11,12 | $ 160.00 |
| 2 | 2,3,4/2,3,4,6/1,4,5,7,9,11,12/4,5,6,7 | $ 160.00 |
| 3 | 2,3,4/4,5,6,7/2,3,4,6/1,4,5,7,9,11,12 | $ 160.00 |
| 4 | 2,3,4/4,5,6,7/1,4,5,7,9,11,12/2,3,4,6 | $ 160.00 |
| 5 | 2,3,4/1,4,5,7,9,11,12/2,3,4,6/4,5,6,7 | $ 160.00 |
| 6 | 2,3,4/11,4,5,7,9,11,12/4,5,6,7/2,3,4,6 | $ 160.00 |
| | Total | $ 960.00 |

The cost of the bet is not comparable with the cost to be paid to place a superfecta box bet. Since the bet involves 10 competitors, a superfecta box with ten competitors has:

$$10\times9\times8\times7=5{,}040 \text{ bets}$$

assuming a cost of $1.00 per bet, the difference regarding 960 is very big.

Notwithstanding the number of wagers in a superfecta box bet, the bettor can only cash in one of such bets. In agreement with the present invention, the bettor has possibilities of cashing in more than one bet if the combination he/she chose is winner.

Functions MIX 2, MIX 3 and MIX 4 perform a similar process to function MIX 1. Function MIX 2 makes the combinations maintaining the group to second place without change. Function MIX 3 makes the combinations maintaining the group to third place without movement. Function MIX 4 makes the combinations maintaining the group to fourth place without change.

However, it is even provided the function [MIX ALL] for combinations of all the groups. Even in this case, the amount of the bet is not comparable to the amount of a superfecta box bet. It is worth mentioning that if the combinations of groups repeat, these will not be considered more than once.

Example:

1,2/1,2,3/2,3/3,4,5 [MIX ALL]

the following bet are generated:

| No. | Bet | Cost |
|---|---|---|
| 1 | 1,2/1,2,3/2,3/3,4,5 | $ 6.00 |
| 2 | 1,2/1,2,3/3,4,5/2,3 | $ 6.00 |
| 3 | 1,2/2,3/1,2,3/3,4,5 | $ 6.00 |
| 4 | 1,2/2,3/3,4,5/1,2,3 | $ 6.00 |
| 5 | 1,2/3,4,5/1,2,3/2,3 | $ 6.00 |
| 6 | 1,2/3,4,5/2,3/1,2,3 | $ 6.00 |
| 7 | 1,2,3/1,2/2,3/3,4,5 | $ 6.00 |
| 8 | 1,2,3/1,2/3,4,5/2,3 | $ 6.00 |

-continued

| No. | Bet | Cost |
|---|---|---|
| 9 | 1,2,3/2,3/1,2/3,4,5 | $ 6.00 |
| 10 | 1,2,3/2,3/3,4,5/1,2 | $ 6.00 |
| 11 | 1,2,3/3,4,5/2,3/1,2 | $ 6.00 |
| 12 | 1,2,3/3,4,5/1,2,/2,3 | $ 6.00 |
| 13 | 2,3/1,2/1,2,3/3,4,5 | $ 6.00 |
| 14 | 2,3/1,2/3,4,5/1,2,3 | $ 6.00 |
| 15 | 2,3/3,4,5/1,2,3/1,2 | $ 6.00 |
| 16 | 2,3/3,4,5/1,2/1,2,3 | $ 6.00 |
| 17 | 2,3/1,2,3/1,2,/3,4,5 | $ 6.00 |
| 18 | 2,3/1,2,3/3,4,5/1,2 | $ 6.00 |
| 19 | 3,4,5/1,2,3/1,2/2,3 | $ 6.00 |
| 20 | 3,4,5/2,3/1,2,3/1,2 | $ 6.00 |
| 21 | 3,4,5/2,3/1,2,3/1,2 | $ 6.00 |
| 22 | 3,4,5/2,3/1,2/1,2,3 | $ 6.00 |
| 23 | 3,4,5/1,2/2,3/1,2,3 | $ 6.00 |
| 24 | 3,4,5/1,2/1,2,3/2,3 | $ 6.00 |
| | | $ 144.00 |

On the other hand, the superfecta box bet with five competitors has a cost of

5!=$120.00 USD

If the bettor wagers on a combination box, he/she will only have one possibility to win; with the method of the invention, it is possible that he/she wins three bets if the bet wins.

The entering of a wager like the one that has been shown with the current betting methods would result in a long time and many possibilities of mistake. It has been already said that the time required to place a bet should be minimal, since 80% of the bets entering is done within the last three minutes before the race.

Due to the similarity of the wagers resulting from the use of the MIX functions, the apparatus according to the present invention provides the function ORIGINAL BET [OB]. Its purpose is to recall the bet that had been originally entered.

This function is especially useful for a bettor who gets usually confused with the different possibilities to make a wager.

In addition, the apparatus of the present invention provides the possibility of transforming the superfecta bet into trifecta and the trifecta into superfecta through the function [TRIv SUP]

A TRIFECTA bet is transformed into a SUPERFECTA by repeating to fourth place the elements given for third place. Example:

1,2/1,2,3/2,3,8[TRIv SUP]’1,2/1,2,3/2,3,8/2,3,8

A superfecta bet is transformed into a trifecta by incorporating the competitors to fourth place into the third place. Example:

3,9,14/1,3,9,14/1,7,9,14/1,2,7,9,10,14 [TRIv SUP] ’3,9,14/1,3,9,14/1,2,7,9,10,14

Group V. Memory Keys

This group refers to the series of keys which are useful to select specific functions provided by the method and apparatus of the present invention to handle data stored in the memory, which conform the registration of bets. Each one of the keys in this group is defined in the following table:

GROUP V MEMORY KEYS

| | NAME | FUNCTION |
|---|---|---|
| 47 | PRINT | Sends all the information of the bets registered in the memory to the communications port. |

-continued

GROUP V MEMORY KEYS

| | NAME | FUNCTION |
|---|---|---|
| 48 | M + | Saves the cost of the bet placed to have a total global balance of the bets. |
| 49 | LOAD | Stores in the memory the current bet that the bettor wants to register. |
| 50 | ERASE | Erases from the memory a previously stored and selected bet. |
| 51 | (NEXT)⇧ | Shows on the screen the immediate next bet that is stored in the memory. |
| 52 | (PREV)⇩ | Shows on the screen the immediate previous that is stored in the memory. |

Figure 5:
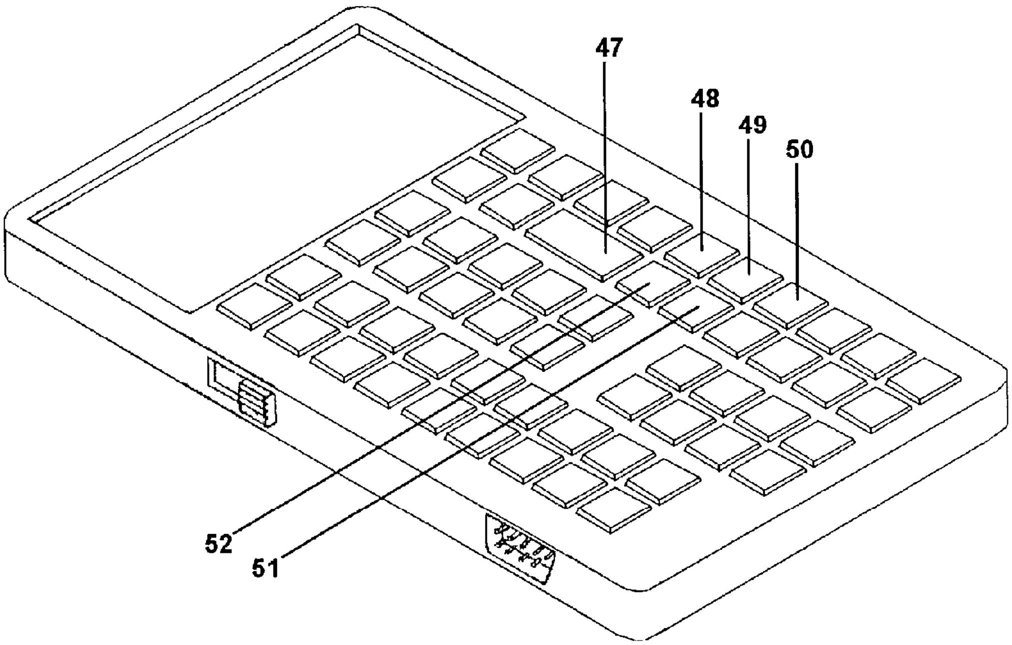
In FIG. 5 it is shown the group of memory keys of the invention's portable apparatus.

The keys of the first column are shown in FIG. 5, where the group of keys detailed in the former table is described.

e) Secondary Option Means

The method and apparatus according to the invention optionally comprise secondary option means for performing secondary option, for example storing bets in the memory, and making changes in the last moment (priori to registering the bet). This group of functions refers to the series of keys that do not belong to a specific group, but which have specific functions. Each one of the keys in this group is defined in the following table:

GROUP VI SECONDARY FUNCTIONS KEYS

| | NAME | FUNCTION |
|---|---|---|
| 53 | SCRATCH | Deletes a competitor from the bet, who unexpectedly, for several reasons, will not be participating. |
| 54 | CLEAR | Clears all the information in the memory and on the screen, except the amount and type of bet, as well as the number of competitors. |
| 55 | NEXT BET | Clears all the information in the memory and on the screen. |

Figure 6:
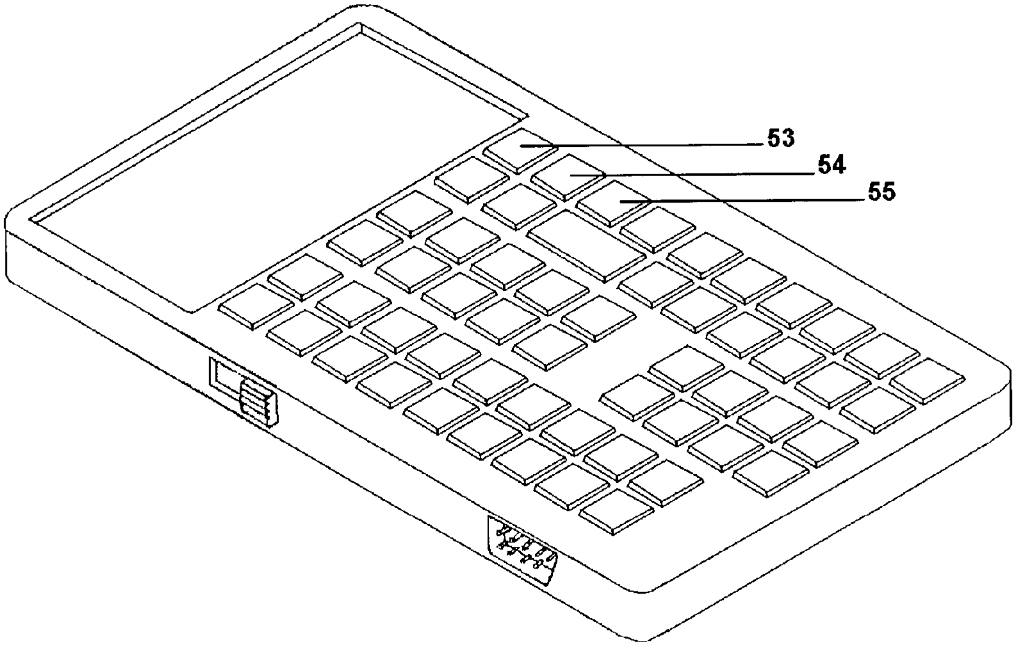
In FIG. 6 the secondary functions group of keys of the invention's portable apparatus are shown.

The numbers of the first column are in relation with FIG. 6, where the group of keys detailed in the former table is described.

Function [SCRATCH] is especially useful. It is very common that one competitor does not participate in the programmed race. It is informed in the last moment that a competitor will not participate in the competition, so that the bettors may be able to modify their bets. However, bettors frequently are not aware on time and they must cancel or modify their bet right when they are entering it. It has already been mentioned that the placement of premature bets affects the bettor’s mood, who usually reduces the amount of the bet he/she had planned.

In agreement with the present invention, function [SCRATCH] deletes automatically from the bet the competitor that cancelled his participation in the last moment.

FIG. B describes the portable apparatus of the invention. The design begins with an energy source of between 5 and 12 volts. This energy allows the supply to each and every one of the electronic components that, necessarily, require polarization, as well as provides useful flow of energy for the codification of the keyboard.

Immediately after the power supply there is a switch connected, which has the particular function of controlling the turning on and off of the apparatus. (FIGS. 7–56).

Figure 7:
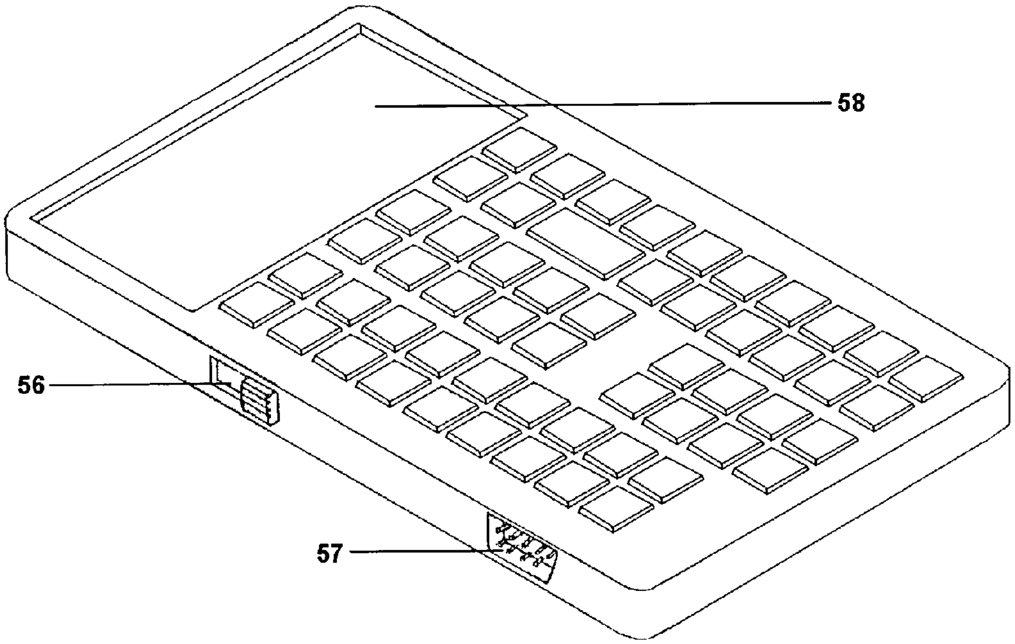
In FIG. 7 the peripherals are shown.
Figure 8:
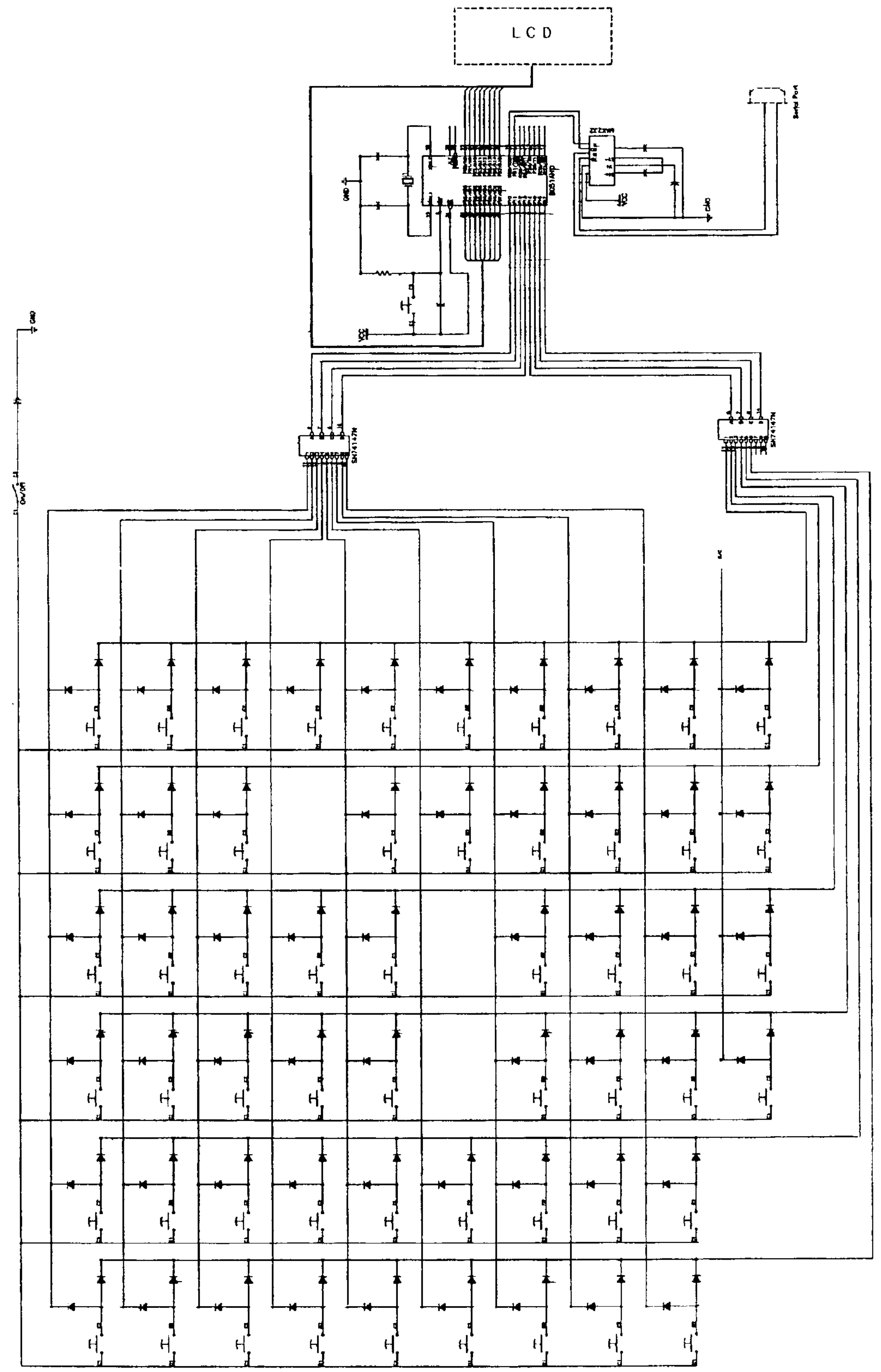
In FIG. 8 it is shown the electronic diagram of the invention's portable apparatus.

55 keys, distributed as shown in FIG. 7, form the keyboard. An open switch and two terminals, to allow for the continuity between terminals when they are pressed, compose the keys. Each one of the keys is connected in one of its terminals to the feeding line coming from the on and off switch. On the other side, the second terminal has, in turn, a pair of diodes connected in direct, which allow for the current to flow, without the voltage dropping below 4 volts.

Everyone of the two diodes of each key is respectively connected to a common point, so that it codifies according to the line where the physical space of each key is located. It is so that, according to the distribution seen in FIG. 7, there are ten lines. In the same manner, the other respective diode of each key serves to codify the column; according to FIG. 7, there are six columns. One of the principal functions of the diodes is to have independent the common points of the columns with respect to the lines or vice versa, because the diodes avoid the flow of current when they are inverted.

According to this form of connection, the keyboard codifies in a matrix type; it means, the key being pressed generates a flow of current in the column as well as in the corresponding line.

The ten common points corresponding to lines, excepting one, are connected to the entries of the logical circuit of the type 74-147, whose function is to codify the line number to a binary form in four bits, the line that is not connected to the logical circuit codifies only the column, having the value of 1111 in bits for the line due to characteristics of the logical circuit; in similar way, the six common points corresponding to columns are connected to another identical logical circuit to codify the number of columns in four bits. It is to be mentioned that, according to the characteristics of the keyboard, it is possible to add or eliminate keys, having a maximum of 256. The union of the 4 bits of column and the four bits of line are connected in an entry port of the processor of the family 8051.

It is possible to design the keyboard in a matrix manner, without requiring the diodes and the 74–147 logical circuits, using a design like the computer keyboard and a logical circuit more advanced, which is known as keyboards codifying, to obtain in such way the same result.

The controller has an inner memory, 4 ports and the necessary and common connections for its proper operation. The common connections are:

- The oscillatory circuit, which is composed of a crystal and two capacitors, whose values are directly related.
- The re-initialization circuit, which is composed of a capacitor, one resistor and a pushbutton, whose values are directly related.

Once one of the ports has been used as inlet, two of the rest will be used as outlet ports to the crystal liquid display or LCD (FIG. 7–58), whose way of connecting will depend on the type of screen used.

Finally, the last port is set in a manner that works as bi-directional serial port (FIG. 7–57) for data exchange, reason why it is used a common use logical circuit for such setting, of the type known as Max232, for its proper operation, in turn, there are 3 capacitors connected, whose values are directly related. Within the peripherals that is possible to connect to this port, there is a printer, an adapter for infrared rays, for parallel port, for USB or any other type of known port in the computer media.

This is especially useful for the bettor to place his/her bet officially without requiring a teller.

It is to be mentioned that the micro-controller has an engraved program to decipher the information codified by the keyboard and to send the results through the LCD or serial port.

With the purpose of giving a clearer description of the invention, a computer program listing appendix is submitted (which has been incorporated by reference) containing computer program listings that performs the before mentioned steps. However, the present invention is only limited to the scope of the attached claims.

The invention claimed is:

1. An apparatus to make bets, comprising:

a plurality of buttons for selecting a type of bet, wherein each button represents a different type of bet;

a plurality of buttons for selecting competitors;

a plurality of buttons for selecting an initial combination of groups of competitors to finish in particular places for creating an original bet; and a plurality of buttons for creating derivative bets, said buttons for creating derivative bets modifying the initial combination of groups of competitors to create derivative combinations of said original bet, wherein the buttons for modifying the initial combination to create derivative bets include a button for transforming a superfecta bet into a trifecta bet and vice-versa, wherein a trifecta bet is transformed into a superfecta bet by repeating for fourth place finishes the same group of competitors previously selected to finish in third place, and wherein a superfecta bet is transformed into a trifecta bet by incorporating into the group of competitors previously chosen to finish in third place those competitors chosen to finish in fourth place that are missing from the group chosen to finish in third.

2. A method to execute bets using an apparatus for making bets, said apparatus including a plurality of buttons for selecting a type of original bet, wherein each button represents a different type of bet; a plurality of buttons for selecting competitors, wherein each button represents a different competitor; a plurality of buttons for selecting an initial combination of groups of competitors to finish in particular places for the original bet; and a plurality of buttons for creating derivative bets, said buttons for creating derivative bets modifying the initial combination of groups of competitors to create derivative combinations of said original bet, said method comprising:

selecting a type of original bet with the apparatus; and selecting an initial combination of groups of competitors to finish in particular places with the apparatus, further comprising transforming, through use of the apparatus, a superfecta bet into a trifecta bet and/or vice-versa, wherein a trifecta bet is transformed into a superfecta bet by repeating for fourth place finishes the same group of competitors previously selected to finish in third place, and wherein a superfecta bet is transformed into a trifecta bet by incorporating into the group of competitors previously chosen to finish in third place those competitors chosen to finish in fourth place that are missing from the group chosen to finish in third.

* * * * *